United States Patent [19]

Everman et al.

[11] Patent Number: 4,798,571

[45] Date of Patent: Jan. 17, 1989

[54] CONTAINER FORMING APPARATUS AND METHOD

[75] Inventors: Wayne F. Everman, Cedar Falls; Randy J. Klug, Dike; Raymond L. Russell, Cedar Falls, all of Iowa

[73] Assignee: Container Corporation of America, Clayton, Mo.

[21] Appl. No.: 109,998

[22] Filed: Oct. 19, 1987

[51] Int. Cl.⁴ ................................................ F16H 7/14

[52] U.S. Cl. .................................... 493/114; 493/125; 493/131; 493/183

[58] Field of Search ........................ 493/114, 120–123, 493/125, 130, 131, 147, 183, 184

[56] References Cited

U.S. PATENT DOCUMENTS

| | | | |
|---|---|---|---|
| 3,456,563 | 7/1969 | Roesner et al. | 493/114 |
| 3,673,928 | 7/1972 | Striplin | 493/114 |
| 4,023,471 | 5/1977 | Royal | 493/114 |
| 4,201,118 | 5/1980 | Calvert et al. | 493/131 X |

*Primary Examiner*—Eugene R. Laroche
*Assistant Examiner*—Robert J. Pascal
*Attorney, Agent, or Firm*—Richard W. Carpenter

[57] ABSTRACT

Apparatus and method for forming a three-piece paperboard, bulk shipping container from a flat collapsed tubular body member and a pair of flat end members, which apparatus and method includes means for erecting the body member from the flat collapsed to the tubular erected condition, pushing both end members against opposite ends of the erected body member at the same time, and then folding and securing the flanges of the end members to opposite ends of the body member.

15 Claims, 11 Drawing Sheets

CONTAINER FORMING APPARATUS AND METHOD

BACKGROUND OF THE INVENTION

1. Field of the Invention

This invention relates to bulk packaging, and more particularly to an improved apparatus and method for forming a three-piece, paperboard, bulk shipping container.

2. Description of Background Art

A search of the related background art in the United States Patent and Trademark Office disclosed the following United States Letters Patent: U.S. Pat. Nos. 3,011,298, 2,932,927, 2,939,260, 3,634,995, 3,896,607, 3,913,300, 3,979,883, 4,400,929.

None of the patents found in the search discloses an apparatus or method for automatically forming a three-piece paperboard bulk shipping container from a tubular body member and a pair of flat end members wherein the end members are applied simultaneously to opposite ends of the body member and the end member flanges are secured to the body member side walls.

SUMMARY OF THE INVENTION

It is an object of the present invention to provide an apparatus and method for automatically forming a three-piece paperboard shipping container from a tubular body member and a pair of flat, flanged, end members.

A more specific object of the invention is the provision of an apparatus and method for automatically forming a three-piece paperboard bulk shipping container by depositing a collapsed body member in flat condition on a conveyor, applying adhesive to marginal edges of the body member, erecting the body member into a tubular structure, pushing end members against opposite ends of the body member structure, and folding and securing flaps of the end members to the side walls of the body member.

These and other objects of the invention will be apparent from an examination of the following description and drawings.

It will be undrstood that, for purposes of clarity, certain elements may have been intentionally omitted from certain views, where they are believed to be illustrated to better advantage in other views.

DESCRIPTION OF THE PREFERRED EMBODIMENT

Each container C includes a tubular body member BM, having a plurality of side walls SW hingedly joined to each other, and a pair of end members or caps EM, each of which includes a flat end wall panel EW and a plurality of flanges or flaps F foldably joined to the side edges thereof and secured to marginal areas at the ends of the body member side walls.

Figures 1, 1A:
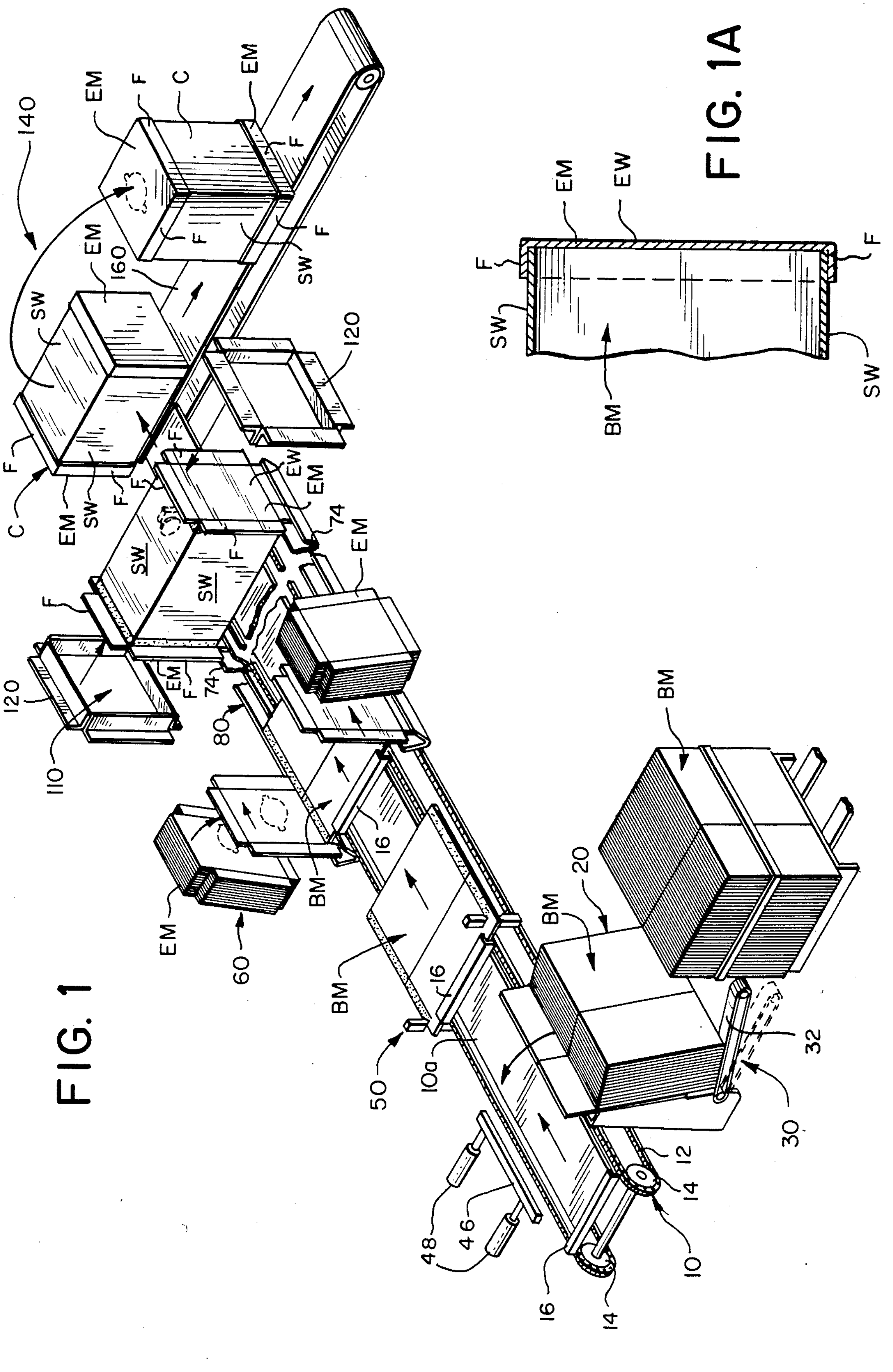
FIG. 1 is a schematic diagram illustrating the concept of the apparatus and method of the present invention.
FIG. 1A is a fragmentary transverse sectional veiw of a completed container showing the attachment of the end member to the body member.
Figure 2:
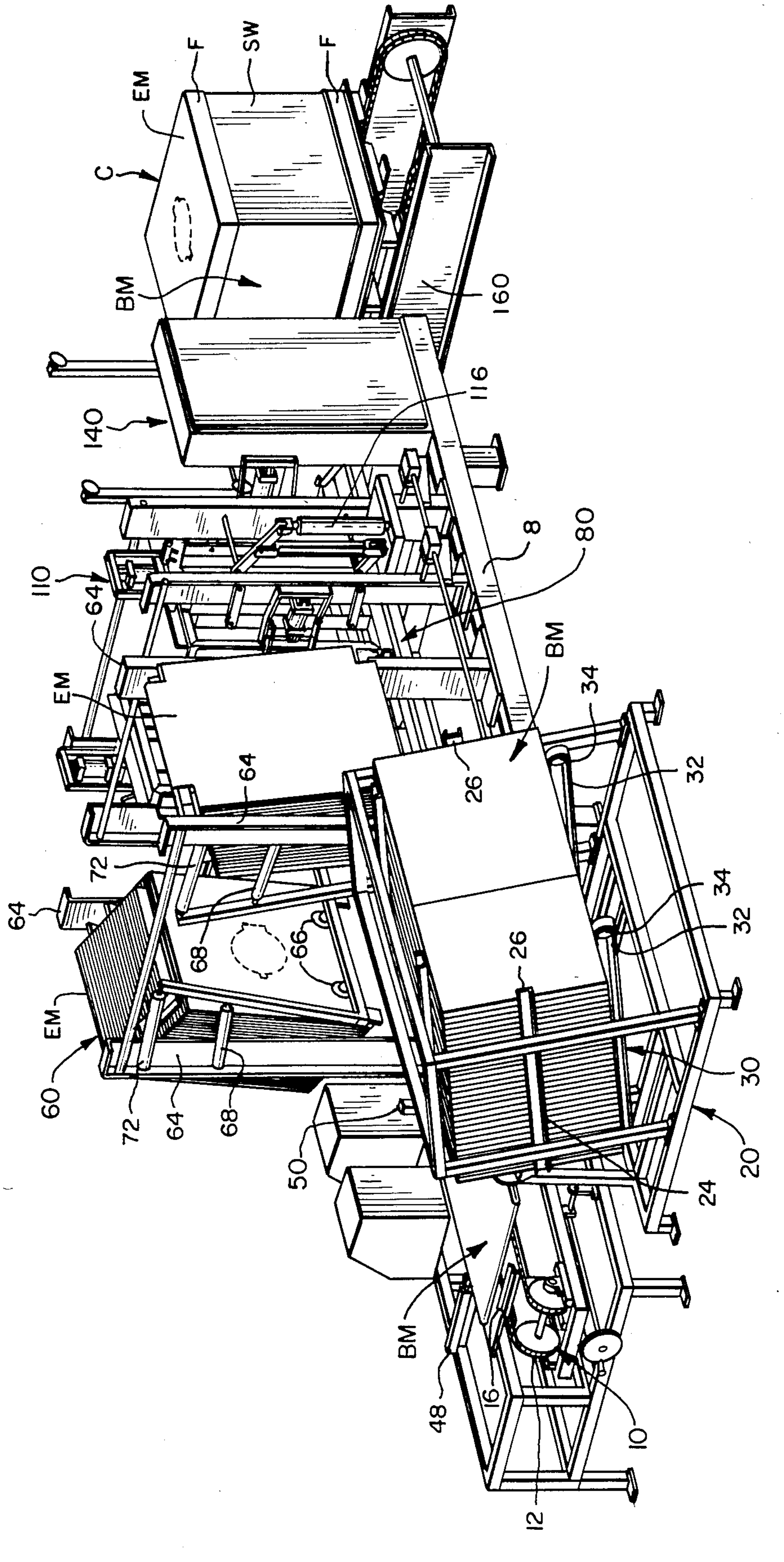
FIG. 2 is a fragmentary isometric view of the apparatus of the present invention.
Figure 3:
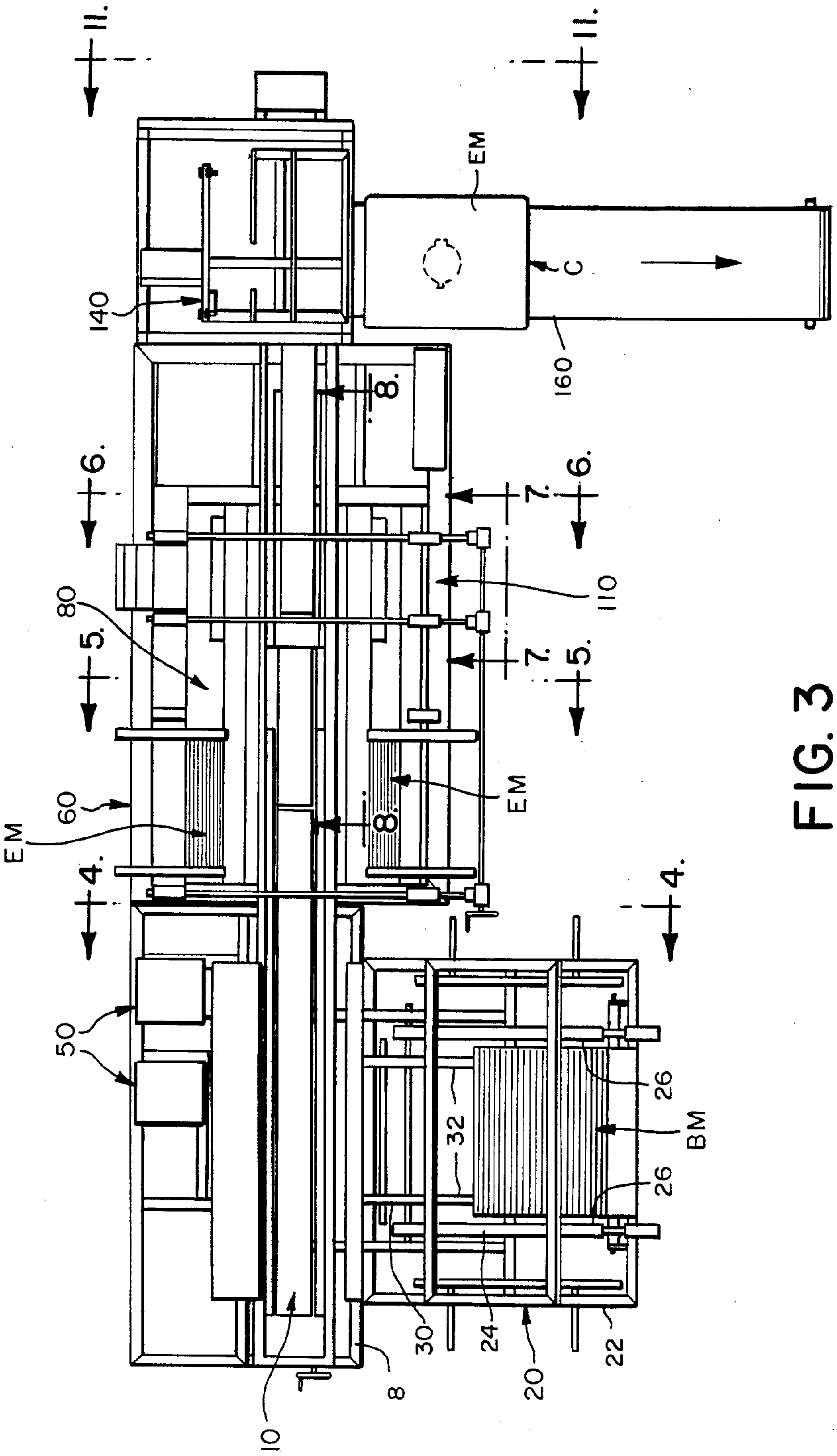
FIG. 3 is a fragmentary top plan view of the structure illustrated in FIG. 2.

Referring now to the drawings for a better understanding of the invention, and particularly to FIGS. 1–3, it will be seen that the primary components of the overall apparatus include a frame 8, a conveyor 10, a body member feeding assembly 20, an adhesive applying assembly 50, an end member feeding assembly 60, a body member erecting assembly 80, an end member attaching assembly 110, and a container inverting assembly 140.

Mounted on the base or frame 8, is a conveyor indicated generally at 10, that passes through the various stations of the container forming operation, and a container inverting section 140 that is disposed at right angles to the container forming section. Each section of the conveyor includes a pair of endless chains 12 driven by pulleys 14 and containing spaced flights 16 which project outwardly therefrom for engagement with body members.

Figure 4:
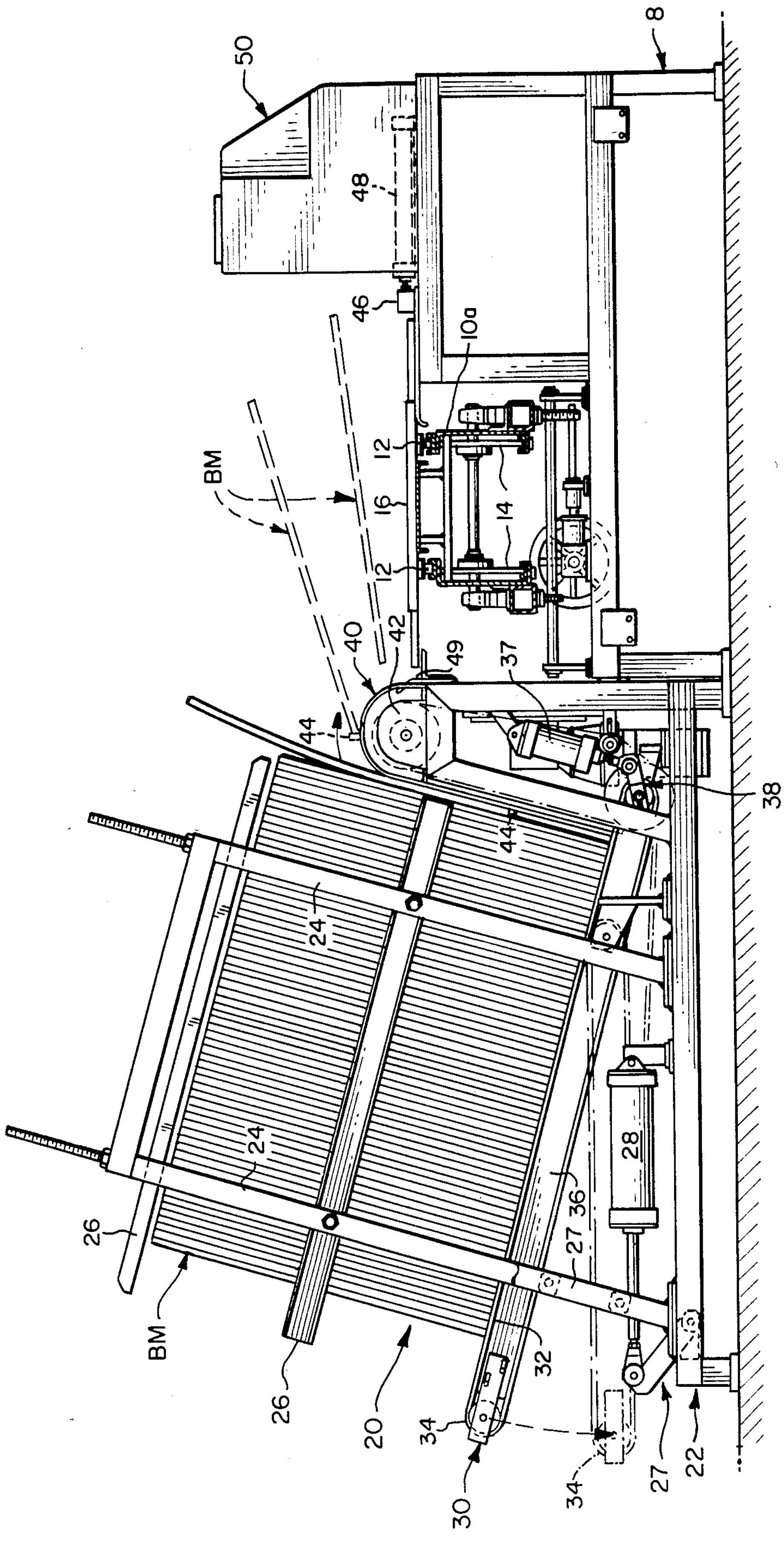
FIGS. 4–6 are fragmentary, vertical, sectional views taken on lines 4—4, 5—5, and 6—6, respectively, of FIG. 3.

Now referring to FIG. 4, it will be seen that a body member feeding assembly, indicated generally at 20, is positioned alongside section 10a of the conveyor adjacent one end thereof. The body member feeding assembly includes a base or frame 22 on which is mounted a magazine or rack 24 adapted to hold a plurality of body members in a flat or collapsed condition. The body members are positioned vertically, so that when they are deposited onto the conveyor, as hereinafter described, they can be rotated through a 90 degree arc from a vertical position to a horizontal position.

Magazine 24 includes a plurality of horizontal guides 26 which may be adjusted to accommodate body members of different sizes. The body members are supported at the bottom of the magazine by belts 32 of a body member advance belt mechanism indicated generally at 30. The body member advance belt mechanism 30 includes one or more belts 32 and pulleys 34 mounted at opposite ends of a generally horizontally disposed frame 36. Frame 36 is attached to frame 22 the upper ends of which are connected by linkage 27 to a cylinder 28 mounted on frame 22. The purpose of this arrangement is to permit the loading end of the magazine to be raised, as shown in FIG. 4, to facilitate feeding of the body members toward conveyor 10.

When it is desired to load the magazine with body members, as illustrated in FIG. 1, the body member advance mechanism 30 is lowered by means of the cylinder 28 and linkage 27 to provide a wider opening between the belts and the top horizontal guide members. Once the magazine is loaded and in the delivery position, as illustrated in FIG. 4, the body member blanks are advanced toward the conveyor by means of the belts 32.

Belts 32 are moved forwardly incrementally by a ratchet-type drive mechanism that includes a cylinder 37, mounted on frame 22 between conveyor 10 and the magazine, and linkage 38 connected to the forward pulleys 34 of the body member advance belt mechanism 30.

As the body members are moved forwardly toward the conveyor, they eventually are engaged by flights 44 of dispenser chains 40 which are driven by pulleys 42. After a body member is lifted over and then dropped onto the conveyor, it is pushed back against a locator plate 49 by means of a locater bar 46, and one or more cylinders 48, which engages the outer edge of the body member and pushes it inboardly toward plate 49.

When a body member is deposited in proper position transversely across conveyor 10, the conveyor moves the body member past an adhesive applying mechanism indicated generally at 50, for the application of adhesive. The details of the adhesive applying mechanism are not shown, as it may be a conventional device applying either cold adhesive or hot-melt adhesive.

Figure 5:
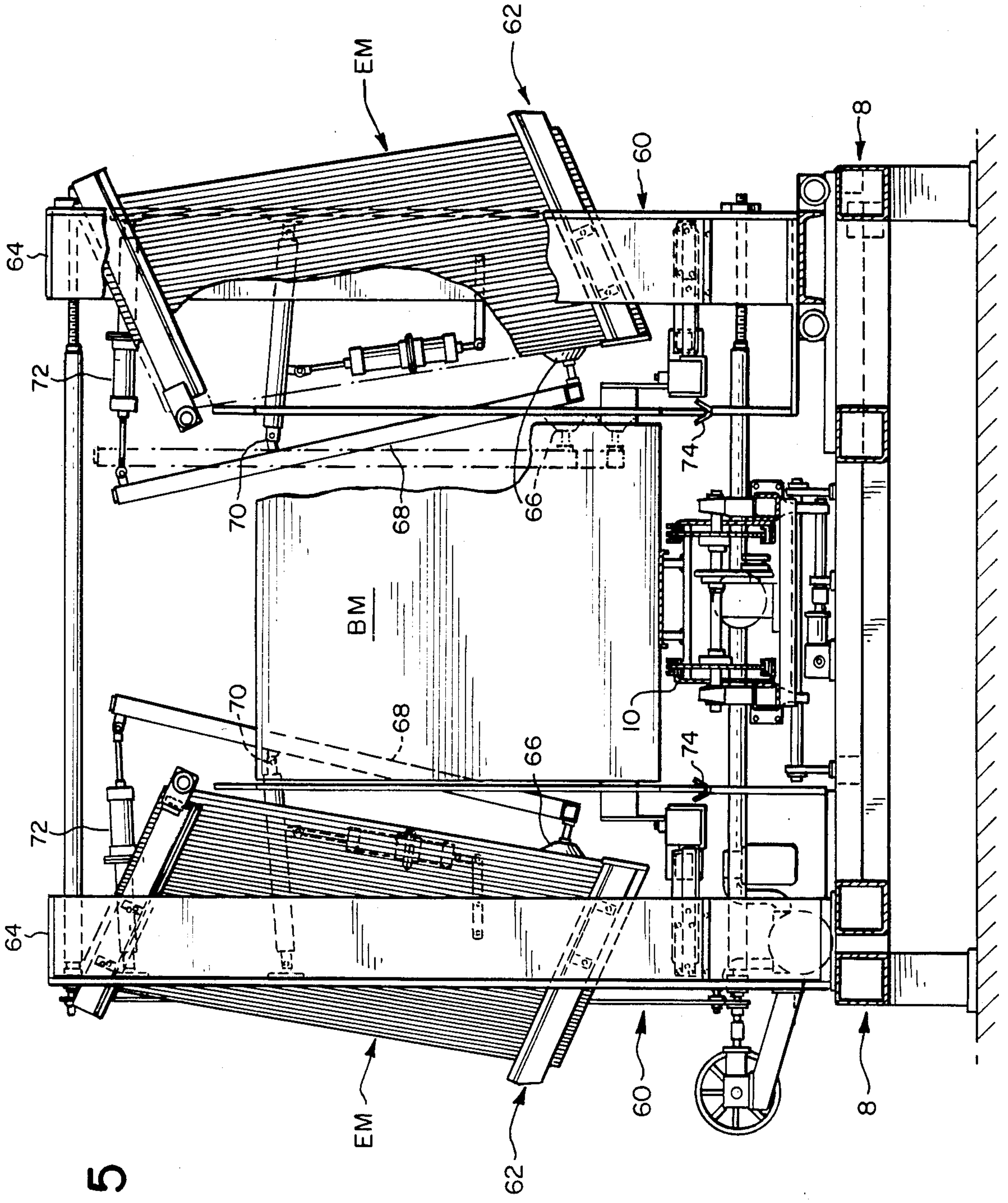

At the same time that a body member is being deposited on the conveyor, a pair of related end wall members EM are delivered to opposite sides of the conveyor by means of an end member feeding assembly, indicated generally at 60 and illustrated in FIG. 5 of the drawings.

The end member feeding assembly includes a pair of similar magazines 62 positioned at opposite sides of conveyor 10 and supported by vertical columns 64. The feeding assembly 60 also includes pairs of delivery arms 68 which are equipped with vacuum cups 66 for engaging the inner surfaces of the end members. Arms 68 are pivoted intermediate their ends at pivots 70 to the frame and are actuated by cylinders 72. The arms pick up the innermost members of each magazine, move them toward the conveyor, and drop them in generally V-shaped channels or tracks 74 at opposite sides of conveyor 10. The end members are then pushed to the container forming station, which is described later in the specification.

Figure 8:
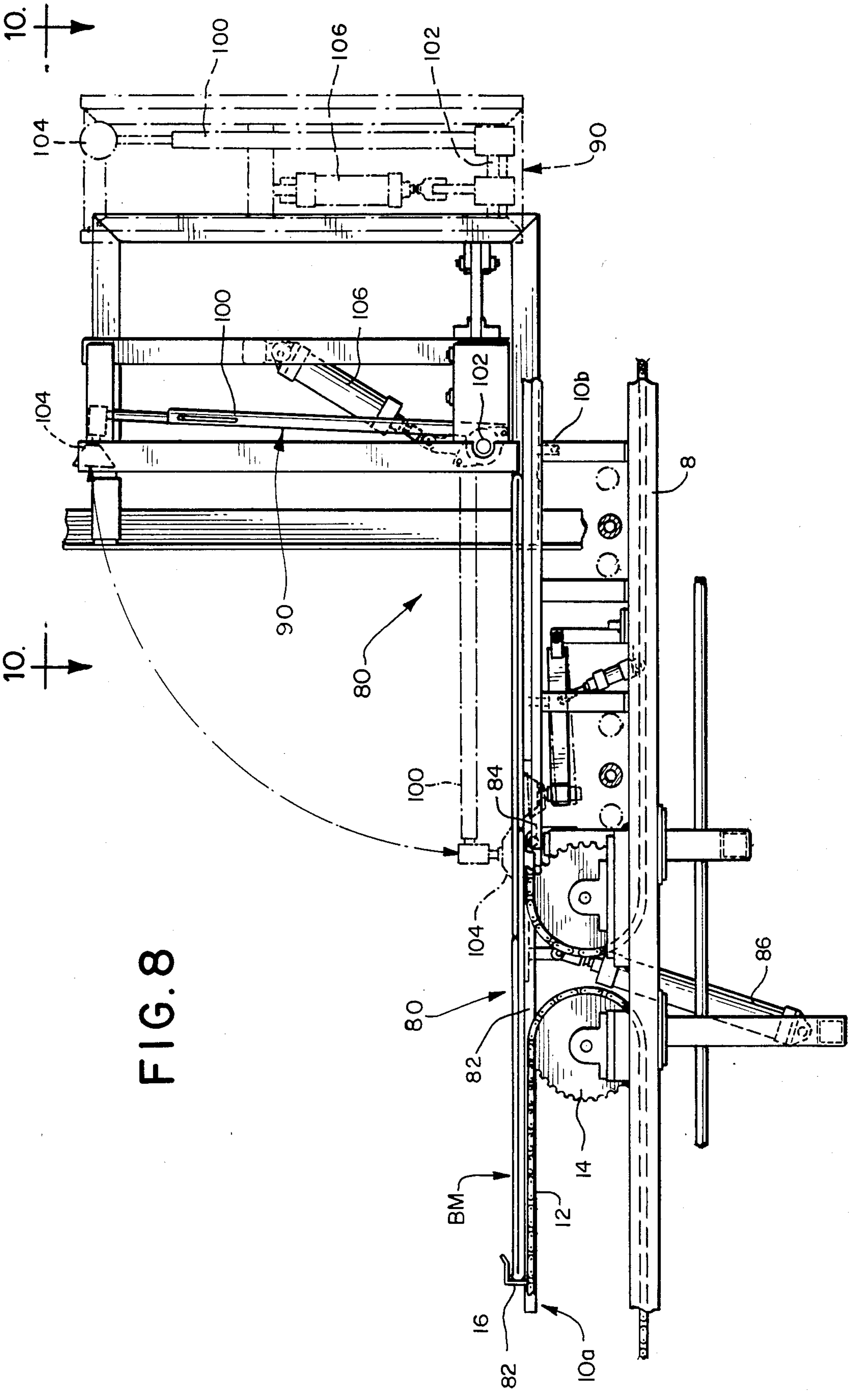
FIG. 8 is a side elevational view taken on line 8—8 of FIG. 3.
Figure 9:
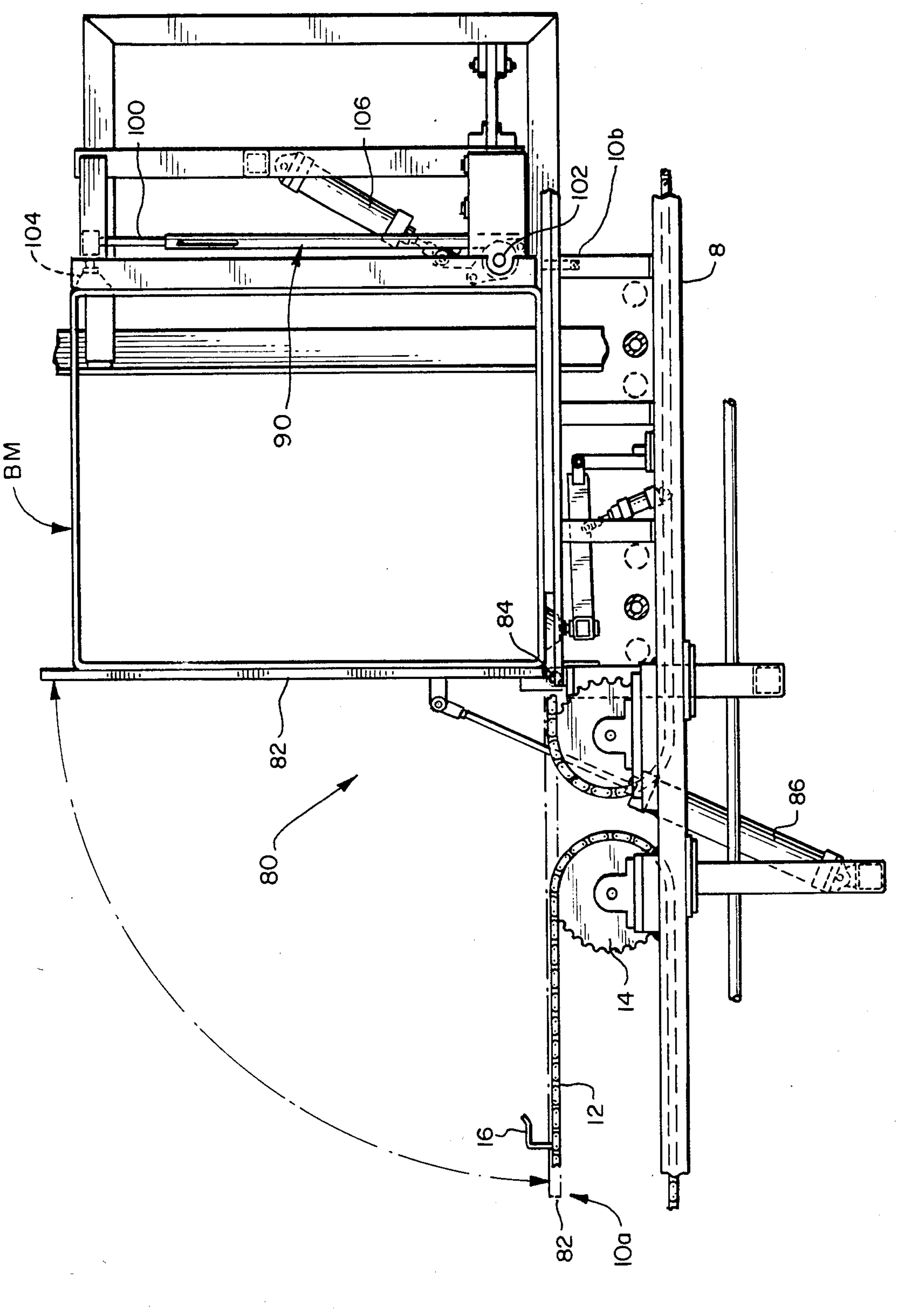
FIG. 9 is a view similiar to that of FIG. 8, but showing the body member erecting mechanism in a different position.
Figure 10:
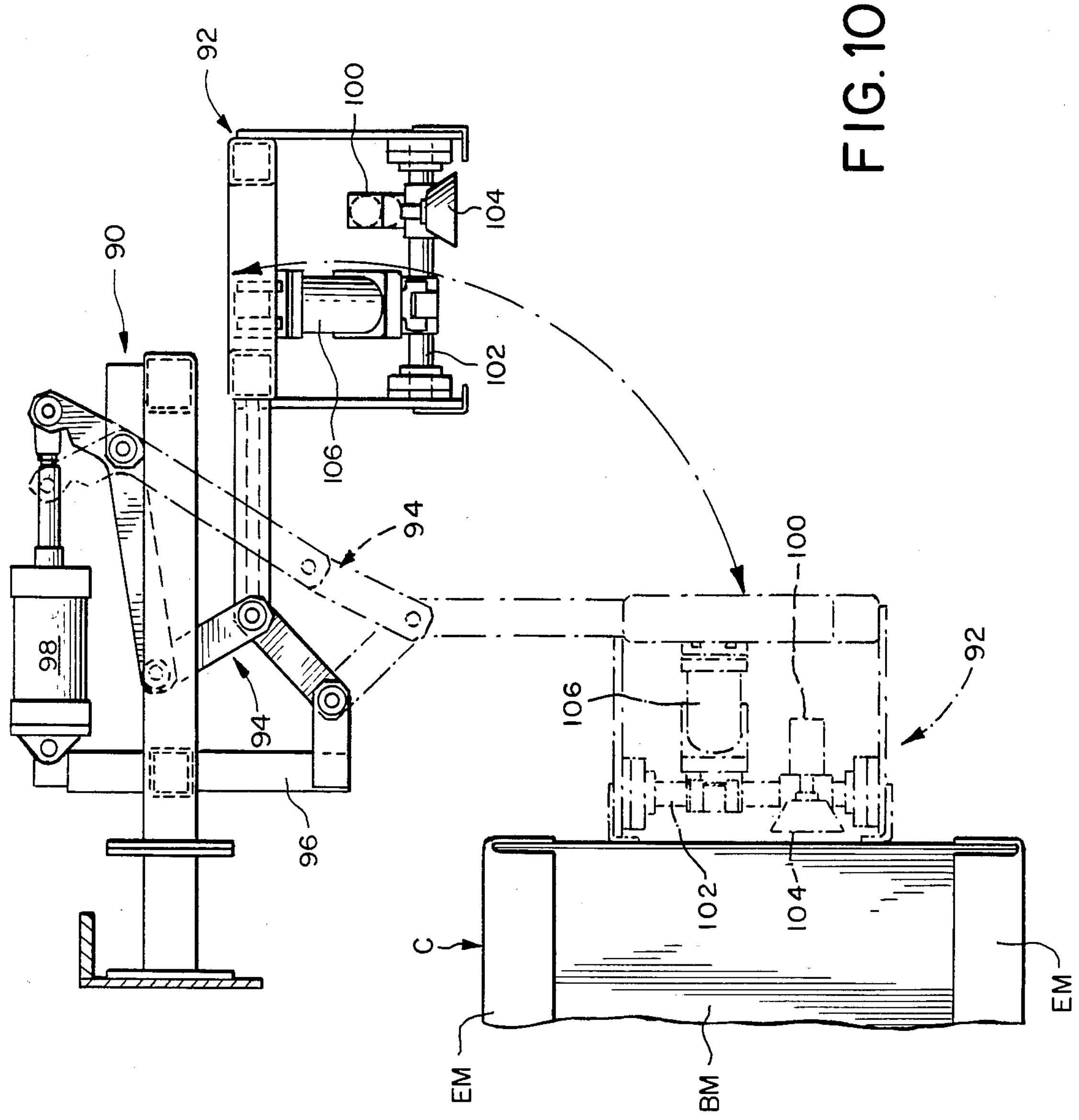
FIG. 10 is a top plan view taken on line 10—10 of FIG. 8.

Now referring to FIGS. 8–10, it will be seen that the body member erecting assembly, indicated generally at 80, includes a rear erector plate, or pair of arms 82, which are pivoted at 84 to the frame and are actuated by cylinders 87 for movement between a horizontal position, shown in FIG. 8, and a vertical position, shown in FIG. 9. As they move from the horizontal to the vertical position they assist in erecting the body member from a collapsed flat condition to an erected tubular condition. At the forward end of the body member, there is provided a front wall erector mechanism, indicated generally at 90, which is more complex than the rear erector mechanism. The reason for this is that the front erector mechanism has to be moved to the side of the conveyor, after each body member has been erected, to permit the body member to move along the conveyor to the container inverting station.

The front wall erector mechanism includes at least one bracket 92 connected by linkage 94 to a mounting bar 96 on the frame and to a cylinder 98 which moves the bracket from a position alongside the conveyor 10 to a position over the conveyor, where the erecting arm can engage one side of the body member to lift it and thereby erect the body member into a tubular condition.

The front erector mechanism includes a front erector arm 100, having at least one vacuum cup 104, which is carried by the bracket 92 and pivoted at 102 to the bracket. The erector arm 100 is actuated by means of a cylinder 106.

Figure 6:
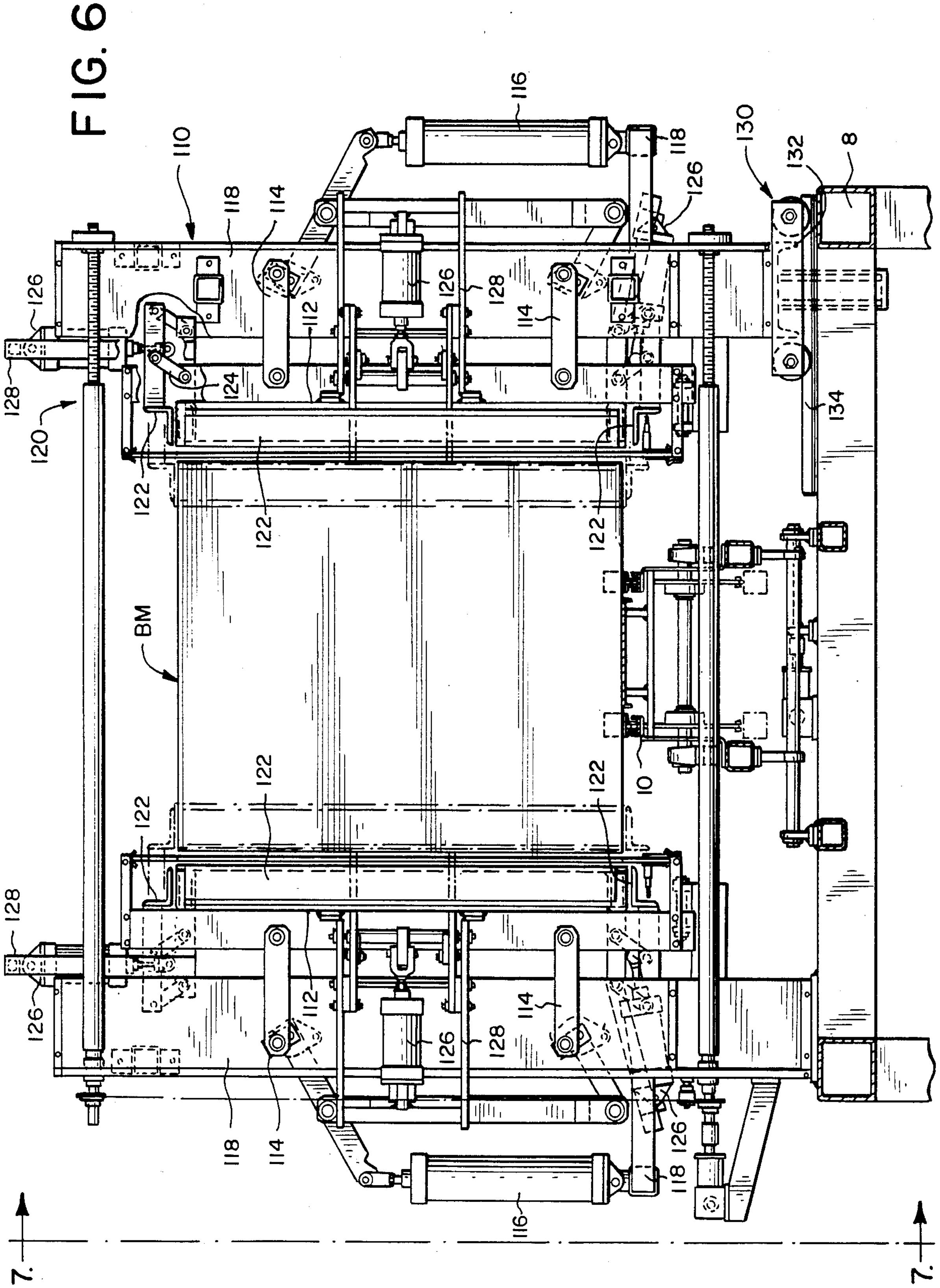
Figure 7:
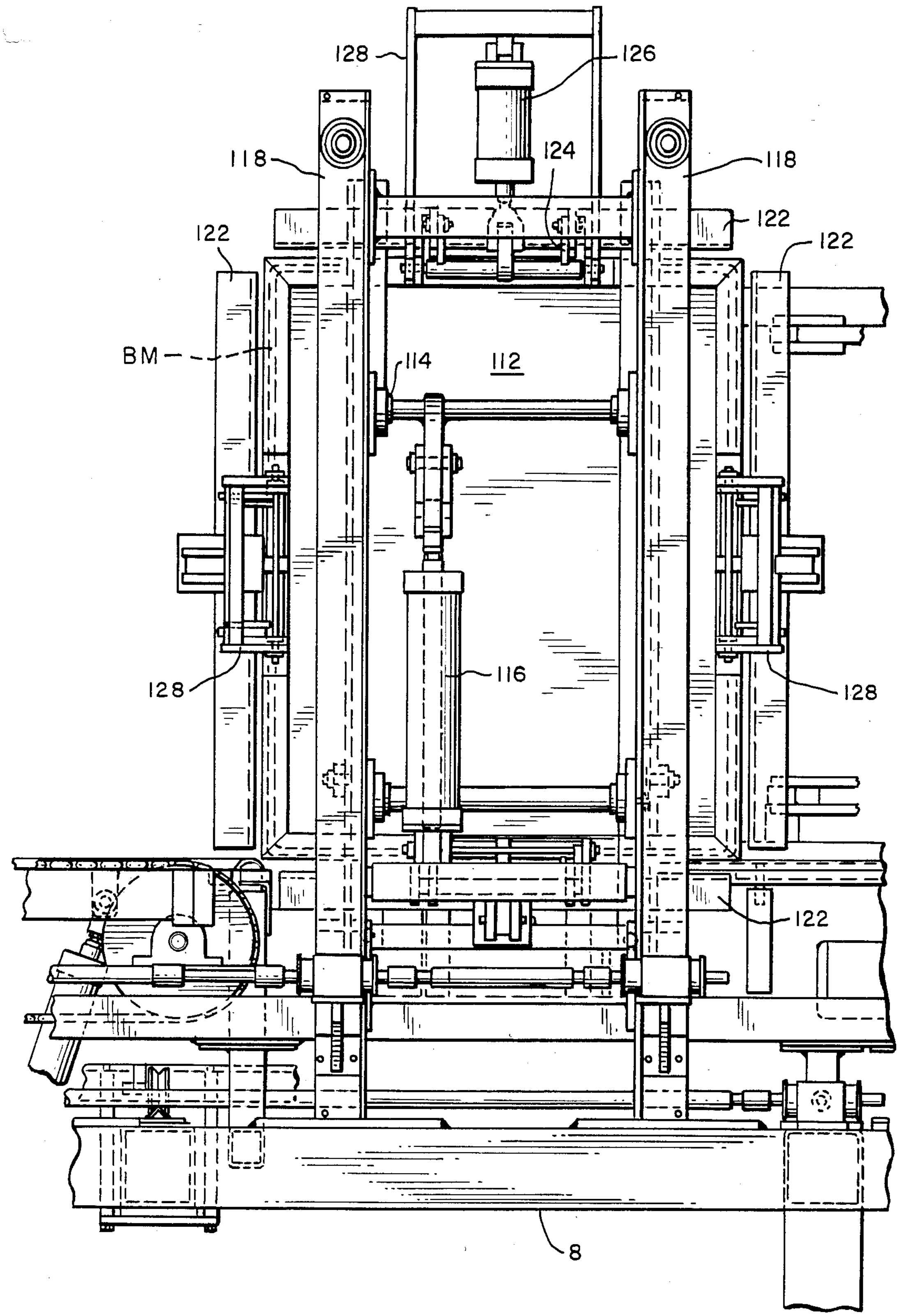
FIG. 7 is a side elevational view taken on line 7—7 of FIG. 3 and line 7—7 of FIG. 6.

As previously mentioned, after the end members have been deposited in the V-shaped channels or tracks 74, they are moved forwardly to the container forming station, where they are attached to a related body member by means of an end member attaching assembly, indicated generally at 110 and best seen in FIGS. 6 and 7.

The end member attaching assembly includes a pair of heavy platens 112 disposed at opposite sides of the conveyor 10 and connected by linkage 114 to a cylinder 116 mounted as at 118 to the frame. The container forming operation commences when the platens are moved forwardly to push a pair of end wall members snugly against opposite ends of an erected body member at the same time.

After the end members have been pushed against the body members, the flaps F of the end members have to be folded 90 degrees and secured against adhesively coated marginal areas of the body member.

Folding of the flanges, or flaps, F is accomplished by the flap folding mechanisms indicated genrally at 120. There are similar mechanisms at the top, bottom, and sides of each of the end members at opposite sides of the conveyor. Each folding mechanism includes one or more plates 122 connected by linkage 124 to a cylinder 126 mounted on a column 128 of the frame. Thus, when the end members are pushed against the ends of the tubular body member, the flaps are folded against the side walls of the body member and held until the glue has set.

To accommodate the formation of containers of different sizes, there may be provided a width adjustment mechanism, indicated generally at 130 and best seen in FIG. 6. This includes a carriage or dolly 132 which rides in a track 134 mounted on frame 8 and which supports the column carrying one of the platens. When a different size box is being formed, the carriage is moved inboardly or outboardly an appropriate distance and locked in position.

Figure 11:
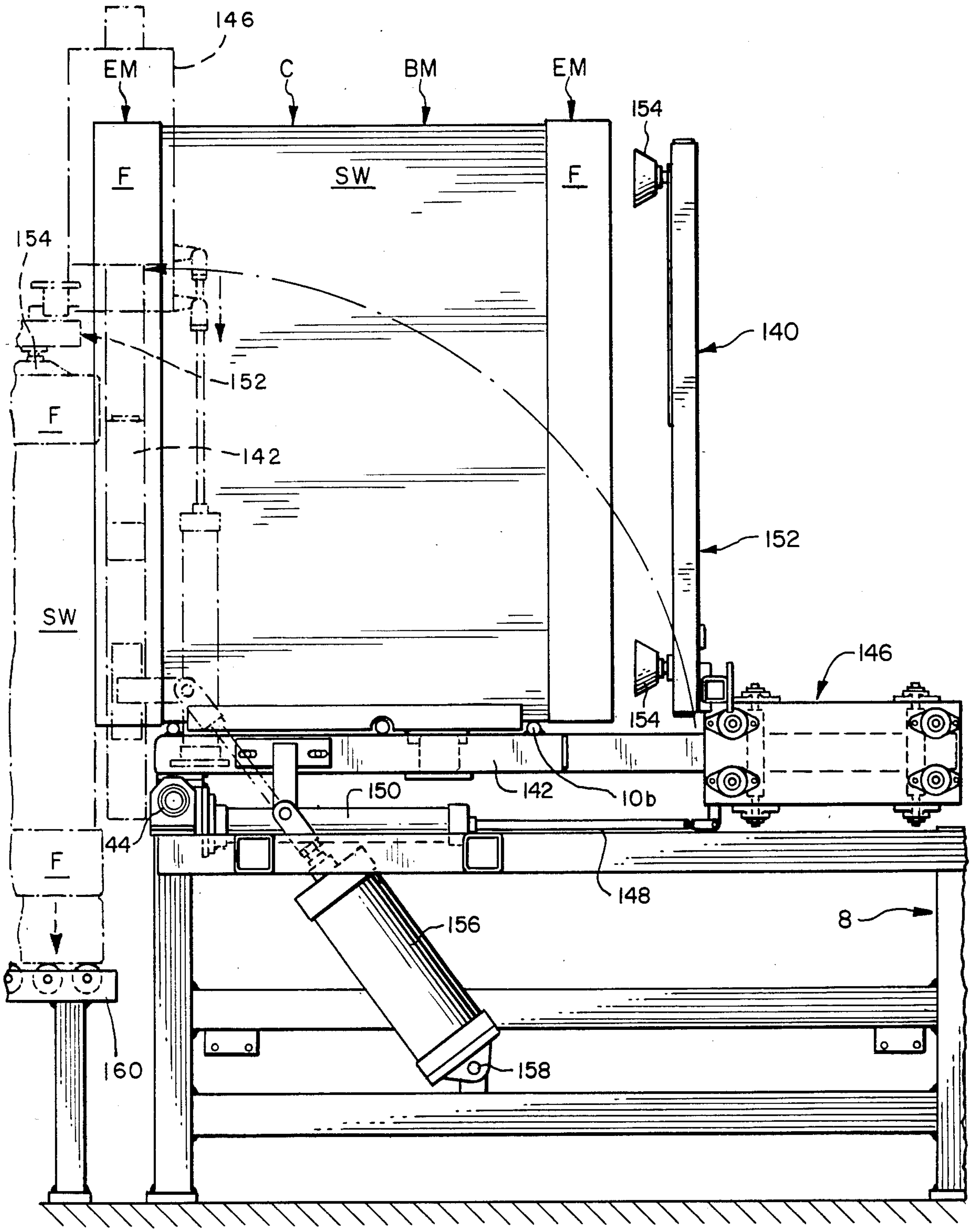
FIG. 11 is an end elevational view taken on line 11—11 of FIG. 3, illustrating the container inverting mechanism.

Before a formed container can be filled, it must be roatated 90 degrees. The container is moved forwardly on section **10*b* of the conveyor, where it enters a container inverting station. The container is inverted by rotating it 90 degrees. This is accomplished by a container inverting assembly, indicated generally at 140 and shown in FIG. 11. The container inverting assembly includes a sub-frame 142, pivoted at 144 to the main frame, and having attached to its free end a carriage 146. Horizontal movement of the carriage is accomplished by a rod 148 of a cylinder 150 mounted on the frame. A pair of delivery arms 152 having vacuum cups at corresponding ends are rigidly mounted to the carriage 146. The arms and carriage are mounted on sub-frame 142 which is pivoted upward by cylinder 156 mounted to the frame at 158**.

When the formed container reaches the appropriate location, the cylinder moves the carriage inwardly until the vacuum cups of the arm engage the upper surface of the container. At this point the cylinder 156 causes the frame 142 to be rotated upwardly 90 degrees from the position shown in FIG. 11, so the container can be deposited on the conveyor section 160 in an upright position, as shown in FIGS. 1 and 2 of the drawings.

Thus it will be appreciated that the invention provides a unique and efficient apparatus and method for automatically forming a three-piece paperboard, bulk shipping container having a tubular body section and upper and lower caps, or end members, with hatch holes which allow the container to be filled after it has been completely formed.

What is claimed is:

1. Apparatus for automatically forming a three-piece bulk shipping container from a pair of top and bottom end members, each having an end wall with flanges foldably joined to side edges thereof, and a collapsed tubular body member, having a plurality of side walls, said apparatus comprising:

(a) conveyor means, for moving said members between operating stations, including a horizontally extending conveyor;
(b) a body member feeding station including body member feeding means disposed adjacent one side of said conveyor for storing said body members in collapsed condition and for placing them, one at a time, horizontally across said conveyor;
(c) an end member feeding station including end member feeding means disposed at opposite sides of said conveyor for storing said top and bottom end members, and for positioning them vertically in channels at opposite sides of said conveyor;
(d) an adhesive applying station located between said body member and end member feeding stations and including means for applying adhesive to end areas of said body members;
(e) a container forming station including:
  (i) body member erecting means for converting said body members from flat collapsed to tubular erected condition;
  (ii) container assembly means for pushing both of said end members snugly against opposite ends of said body member at the same time and for folding said flanges against the side walls thereof.

2. Apparatus for automatically forming a three piece bulk shipping container from a pair of top and bottom end members, each having an end wall with flanges foldably joined to side edges thereof, and a collapsed tubular body member having a plurality of side walls, said apparatus comprising:

(a) conveyor means, for moving said members between operating stations of said apparatus, including a horizontally extending conveyor;
(b) a body member feeding station including body member feeding means for placing said body members, one at a time, horizontally across said conveyor;
(c) an end member feeding station including end member feeding means for positioning said top and bottom end members vertically at opposite sides of said conveyor;
(d) means for applying adhesive to areas of said body members;
(e) a container forming station including:
  (i) body member erecting means for erecting said body members from flat collapsed to tubular erected condition;
  (ii) container assembly means for pushing both of said end wall members snugly against opposite ends of said body member at the same time and for folding said flanges against the side walls thereof.

3. A method for automatically forming a three piece bulk shipping container from a pair of top and bottom members, each having an end wall with flanges foldably joined to side edges thereof, and a collapsed tubular body member having a plurality of side, walls said method comprising the steps of:

(a) depositing said body members in flat collapsed condition horizontally across said conveyor;
(b) applying adhesive to areas of said body members adjacent opposite ends thereof;
(c) positioning said top and bottom end members, in flat collapsed condition vertically at opposite sides of said converyor;
(d) erecting said body members from flat collapsed to tubular erected condition;
(e) pushing said top and bottom end members snugly against opposite ends of said erected body member at the same time;
(f) folding said end member flanges against said body member side walls and securing them thereto.

4. Apparatus according to claim 2, wherein said body member feeding means includes means for storing a pluraltiy of body members in flat collapsed condition adjacent one side of said conveyor and for depositing them, one at a time, transversely across said conveyor.

5. Apparatus according to claim 2, wherein said end member feeding means includes longitudinally extending channels at opposite sides of said conveyor, for holding said end members, and means for pushing them forwardly in said channels.

6. Apparatus according to claim 2, wherein said body member erecting means includes first means for pushing one side wall up from a horizontal to a vertical position and second means for pulling another side wall of said body member away from said one side wall thereof.

7. Apparatus according to claim 2, including means for rotating a completed container ninety degrees on said conveyor.

8. Apparatus according to claim 2, wherein said conveyor is generally L-shaped and includes one section extending between said body member feeding and container forming stations and another section normal to said one section and through a station where completed containers are rotated ninety degrees to an upright position.

9. Apparatus according to claim 2, wherein said top and bottom end members are both pushed against said container body member and secured thereto at the same time.

10. A method according to claim 3, wherein top and bottom end members are both pushed against said body member and secured thereto at the same time.

11. Apparatus according to claim 4, wherein said body member feeding apparatus includes:

(a) a magazine for storing a plurality of flat body members standing vertically on side edges thereof;
(b) first endless conveyor means for moving said body members incremently forward toward said conveyor;
(c) second endless conveyor means for lifting said body members from said first conveyor means, one at a time, and depositing them onto said conveyor.

12. Apparatus according to claim 4, wherein said body member feeding means includes a magazine for storing a plurality of flat body members standing vertically and supported on at least one generally horizontally extending transfer belt operable to move said body members toward said conveyor.

13. Apparatus according to claim 12, wherein said transfer belt is movable in a vertical plane between an upper operating position, for moving body members toward said conveyor, and a lower loading position, to accommodate loading a bundle of body members into said magazine through an open end thereof.

14. Apparatus according to claim 6, wherein said first means includes an element pivotally mounted adjacent one end thereof for movement in a vertical plane.

15. Apparatus according to claim 6, wherein said second means includes:

(a) one mechanism mounted for pivotal movement in a horizontal plane between an operating position over said conveyor and a non-operating position alongside said conveyor;

(b) another mechanism pivotably mounted to said one mechanism for movement in a vertical plane.

* * * * *